United States Patent [19]

Helweg-Larsen et al.

[11] Patent Number: 5,056,792
[45] Date of Patent: Oct. 15, 1991

[54] BUSINESS EDUCATION MODEL

[76] Inventors: Brian Helweg-Larsen, 16 Highmore Cottages, Little Missenden, Amersham, England, HP7 0RB; Gordon F. Cousins, 4, Delamare Street, Farramere, Benoni, Transvaal, South Africa

[21] Appl. No.: 475,776

[22] Filed: Feb. 6, 1990

[30] Foreign Application Priority Data

Feb. 7, 1989 [GB] United Kingdom ............... 8902680

[51] Int. Cl.$^5$ .................... A63F 3/00; G09B 19/18
[52] U.S. Cl. ................................ 273/278; 434/107; 434/109
[58] Field of Search ............ 273/256, 278, 290; 434/107, 109

[56] References Cited

U.S. PATENT DOCUMENTS

| | | | |
|---|---|---|---|
| 2,133,515 | 10/1938 | Horton | 273/278 |
| 2,723,857 | 11/1955 | Miller et al. | 273/256 |
| 4,386,778 | 6/1983 | Hall | 273/256 |
| 4,529,205 | 7/1985 | Bowker | 273/256 |

Primary Examiner—Benjamin Layno
Attorney, Agent, or Firm—Harness, Dickey & Pierce

[57] ABSTRACT

A business education model in which players may simulate the running of a company with the amounts and types of assets, liabilities and future commitments, contingent liabilities, of a company or other business enterprise being shown through the number, color and positions of symbols and markers on a board. The board is marked out with areas representing business premises or factory plant, areas for stocking bought raw material, tokens to represent values of raw material and goods for sale, cash and debts, these different tokens being preferably of a similar size but of different colors so that it can readily be appreciated what they represent, with their value being apparent by their total. The board also includes areas for illustrating the expense of the equipment and manning of plant, for processing cash and loans, for showing the costs of building up a marketing force and for containing tokens showing overhead expenditures incurred in the running of the model business.

28 Claims, 10 Drawing Sheets

Fig. 9.

The Checklists

Every Month

| | | | |
|---|---|---|---|
| 1. New Markets* | | | |
| 2. Obtain Raw Materials | | | |
| 3. Update Raw Material Orders* | | | |
| 4. Production | | | |
| 5. Invest in Plant* | | | |
| 6. Recruitment and Training* | | | |
| 7. Bring Raw Materials to Plant | | | |
| 8. Pay Labour | | | |
| 9. Research and Development* | | | |
| 10. Update Debtors | | | |
| 11. Update Creditors | | | |
| 12. Update Loans | | | |
| 13. Pay Sales Saleries | | | |
| 14. Pay Administration | | | |
| 15. Delivery Note, Make Deliveries | | | |

Every Quarter

| | |
|---|---|
| 1. Pay Plant Overheads: 1,000 per plant | |
| 2. Show Depreciation | |
| 3. Pay Rent: 1,000 per factory building | |
| 4. Pay Interest on Medium-term Loans | |
| 5. Complete Income Statement | |
| 6. Complete Balance Sheet | |
| 7. Buy Market Research | |
| 8. Recruit new Sales Staff | |
| 9. Prepare Tenders | |
| 10. Sell at Market | |

Delivery Note

|  | Y | B | W | Br | Total |
|---|---|---|---|---|---|
| Units |  |  |  |  |  |
| Order Value |  |  |  |  |  |
| Material Cost |  |  |  |  |  |
| Labour Cost |  |  |  |  |  |

TENDER FORM

| CBD Market | | Tender Number | _____ |
|---|---|---|---|
| Company | _____ | Product | _____ |
| Delivery | _____ | Units | _____ |
| Credit terms | _____ | Total Price | _____ |

Fig. 12.

The Market
1988 Q.4

Yellows

| Order number | Quantity | Credit terms | Total price |
|---|---|---|---|
| H1 | 16 | 90 | |
| H2 | 12 | 60 | |
| H3 | 11 | 60 | |
| H4 | 8 | 30 | |
| H5 | 7 | 30 | |
| H6 | 6 | CASH | |
| | | | |
| | | | |
| E7 | 14 | 30 | |
| E8 | 12 | 60 | |
| E9 | 9 | CASH | |
| E10 | 7 | CASH | |
| E11 | 6 | 30 | |
| E12 | 5 | 30 | |
| E13 | 4 | CASH | |
| E14 | 3 | CASH | |
| | | | |
| A15 | 12 | CASH | |
| A16 | 7 | 30 | |
| A17 | 6 | 30 | |

Blues

| Order number | Quantity | Credit terms | Total price |
|---|---|---|---|
| H18 | 6 | 60 | |
| H19 | 5 | 30 | |
| H20 | 4 | 30 | |
| | | | |
| | | | |
| | | | |
| | | | |
| E21 | 5 | CASH | |
| | | | |
| | | | |
| | | | |
| | | | |
| | | | |
| | | | |
| | | | |
| A22 | 8 | 30 | |
| A23 | 3 | CASH | |

Fig. 13.

1988 Jan-Mar Income Statement

| | |
|---|---|
| Sales | |
| Cost of Sales | Raw Materials |
| | Labour |
| | Total Cost of Sales |
| Contribution | |
| Factory Overheads | Plant Overhead |
| | Unrecovered Labour |
| | Depreciation on Plant |
| | Total Factory Overheads |
| Gross Margin | |
| Selling Expenses | Sales Saleries |
| | Market Research |
| | Advertising |
| | New Markets |
| | Total Selling Expenses |
| Administration | |
| Recruitment & Training | |
| Rent | |
| Leases on Vehicles | |
| Research & Development | |
| | Total Operating Expenses |
| Profit Before Interest 7 Tax (PBIT) | |
| Finance Charges | Cash Discounts |
| | Interest on Loans |
| | Total Finance Charges |
| Profit before Tax (PBT) | |
| Tax | |
| Net Profit | |

Opening Retained Earnings (from last balance sheet)
Add Net Profit this period (see above)
Closing Retained Earnings (to current balance sheet)

Fig. 14.

1988 March Balance Sheet

ASSETS
Current Assets
    Cash    _____
    Debtors  _____
    Stocks - Raw Materials_____
             Work in Progress_____
             Finished Goods_____
          Total Current Assets Current Liabilities
    Creditors  _____
    Taxation due_____
         Total Current Liabilities Net Working Capital Fixed Assets
    Land & Buildings_____
    Plant & Machinery_____
         Total Fixed Assets

NET ASSETS

FINANCED BY:
Share Capital & Reserves
    Share Capital_____
    Share Surplus_____
    Retained Earnings_____
         Total Share Capital & Reserves Borrowings
    Short-term Loans_____
    Medium-term Loans_____
    Debentures _____
         Total Borrowings

TOTAL FINANCING

Fig. 15.

Lookup Table : RRP 9

| 10 | | |
|---|---|---|
| 63 - 80 | | 12 |
| 81 - 89 | | 11 |
| 90 - 98 | | 10 |
| 99 - 107 | | 9 |
| 108 - 116 | | 8 |
| 117 - 125 | | 7 |
| 126 - 134 | | 6 |
| 135   143 | | 5 |
| 144 - 146 | | 4 |
| 147 - 148 | | 3 |
| 149 - 149 | | 2 |
| 150 - 152 | | 1 |
| 153 + | | 0 |

| 9 | | |
|---|---|---|
| 57 - 71 | | 11 |
| 72 - 80 | | 10 |
| 81 - 89 | | 9 |
| 90 - 98 | | 8 |
| 99 - 107 | | 7 |
| 108 - 116 | | 6 |
| 117 - 125 | | 5 |
| 126 - 130 | | 4 |
| 131 - 132 | | 3 |
| 133 - 134 | | 2 |
| 135 - 137 | | 1 |
| 138 + | | 0 |

| 8 | | |
|---|---|---|
| 50 - 60 | | 10 |
| 61 - 71 | | 9 |
| 72 - 80 | | 8 |
| 81 - 89 | | 7 |
| 90 - 98 | | 6 |
| 99 - 107 | | 5 |
| 108 - 115 | | 4 |
| 116 - 117 | | 3 |
| 118 - 119 | | 2 |
| 120 - 121 | | 1 |
| 122 + | | 0 |

| 7 | | |
|---|---|---|
| 51 - 62 | | 8 |
| 63 - 71 | | 7 |
| 72 - 80 | | 6 |
| 81 - 89 | | 5 |
| 90 - 98 | | 4 |
| 99 - 102 | | 3 |
| 103 - 104 | | 2 |
| 105 - 106 | | 1 |
| 107 + | | 0 |

| 6 | | |
|---|---|---|
| 41 - 53 | | 7 |
| 54 - 62 | | 6 |
| 63 - 71 | | 5 |
| 72 - 80 | | 4 |
| 81 - 86 | | 3 |
| 87 - 88 | | 2 |
| 89 - 91 | | 1 |
| 92 + | | 0 |

| 5 | | |
|---|---|---|
| 32 - 44 | | 6 |
| 45 - 53 | | 5 |
| 54 - 62 | | 4 |
| 63 - 71 | | 3 |
| 72 - 73 | | 2 |
| 74 - 76 | | 1 |
| 77 + | | 0 |

| 4 | | |
|---|---|---|
| 25 - 35 | | 5 |
| 36 - 44 | | 4 |
| 45 - 53 | | 3 |
| 54 - 58 | | 2 |
| 59 - 60 | | 1 |
| 61 + | | 0 |

| 3 | | |
|---|---|---|
| 19 - 26 | | 4 |
| 27 - 35 | | 3 |
| 36 - 43 | | 2 |
| 44 - 45 | | 1 |
| 46 + | | 0 |

| 2 | | |
|---|---|---|
| 18 - 26 | | 2 |
| 27 - 30 | | 1 |
| 31 + | | 0 |

BUSINESS EDUCATION MODEL

This invention relates to a business education model whereby players may simulate the running of a company with the amounts and types of assets, liabilities and future commitments (contingent liabilities) of a company or other business enterprise being shown through the number, colour and position of symbols and markers on a board. This allows the changes in the company's financial and strategic position to be shown visually so that the results of decisions taken by its members can be explained, perceived and analysed by a visual analogy to the real-world situation which the model mimics.

While the model can be used as a support equipment for business games or case study analysis in any type of business education, whether to teach marketing, accounting or finance, it is illustrated herein as a model representing the complete running of a company from the ordering of raw materials to the processing of those raw materials into a finished product and then the marketing with appropriate provision being made continuously for creditors, debtors and expenses including depreciation and training and labour costs.

It is an object of the present invention to provide a business education model which can be used by players to simulate and practice the running and management of a company in a learning environment.

SUMMARY OF THE INVENTION

According to the invention, there is provided a board marked out with areas representing factory plant, areas for stocking bought raw material, tokens to represent values of raw material, cash and debts, these different tokens being preferably of a similar size but of different colours so that it can readily be appreciated what they represent and their value can also be appreciated by their total. The board also contains areas for illustrating the expense of the equipment and manning of manufacturing plant, for processing cash and loans, for showing the costs of building up a marketing force and for containing tokens showing expenditure incurred in the running of the model business.

Generally, the values on the model are shown by a pile of markers and the nature of the item, as indicated above, is shown by the colours of the markers. For instance, cash in hand may be money colour, e.g. silver, creditors may be represented by debt colour, e.g. red, and stocks may be represented by colours representing the material or items to be bought in. While a single different colour, for example yellow might be used to indicate raw material, in other cases various raw materials may be required in a particular plant for processing and thus, for example, yellow might represent sugar, white might represent flour and brown might represent chocolate. In manufacturing goods on the model in the plant, represented by plant cards, the product of the plant will comprise a pile of markers or tokens representing the materials as referred to above together with the direct labour cost added as money coloured markers, so that the marginal, full or standard cost of production can be shown at will.

Preferably, tubes are provided for containing the value markers, these being open topped so that they can readily have the value markers or tokens inserted into or tipped out. These tubes make the piles of markers easier to handle and count and may be used to show further information, such as the nature of the item, e.g. fixed or current assets, or the currency represented, e.g. pounds or dollars. Thus, the transparent plastic tubes may be of varying shape or colour but preferably are not circular so that they are less likely to roll about if knocked over.

Cash flows on the board are shown by money coloured markers on the board e.g. from a cash store area to locations representing the overheads to be paid, for example in labour, plant or factory costs, or in advertising or in training staff to develop different overseas markets.

Fund flows can be shown by the movements of all markers with growth and decline of the amount of markers of all types in various areas of the board.

The board can also show depreciation, a non-cash expense, by the movement of markers or tokens showing the value of equipment from the fixed asset areas on the board to the expense areas of the board, leaving dwindling values behind.

Employees can be shown as people markers which can show the cost of recruitment and training through the number of markers although instead of using separate coloured markers as employees, the simple cash markers could be processed instead.

The machinery in the plant is represented both by a pile of value markers, through which the capital investment and book value in the plant is shown, and also, preferably, by tokens, conveniently in the form of cards, whose colour and design represent the nature of the machine, the type of production and processing it uses, its capacity and the type of product it produces currently.

Market leadership may be shown by possession of a token, e.g. a coloured hat or nameboard, which can confer advantages in competing with other companies. Nominally, this market leadership will be achieved by the company, where a plurality of companies are competing, which had the largest sales in a particular market during the previous accounting period.

Competition for orders occurs through decisions taken in each company or business about the range of products they wish to sell, the markets they wish to enter, and the sales and distribution mechanism they employ. As a result of these decisions, which are shown by the deployment of markers on the board, the companies are issued with a limited number of tender forms which they can use to tender to supply certain customers with the goods they require at a particular price and with a certain delivery date. Used in this way, a plurality of companies each run by one or a group of people practice on separate boards comprising separate models with interlinking occurring through competition at the marketing stage.

The invention will be further described, by way of example, with reference to the accompanying drawings, in which.

Figures 10, 11, 16:
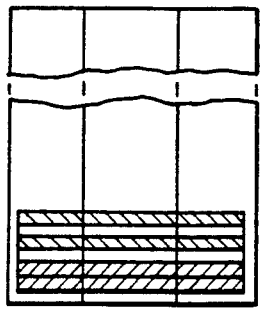

FIGS. 4a and 4b, 5a and 5b, 6a and 6b, 7a and 7b and 8a and 8b show opposite sides of other exemplary plant cards;

FIG. 9 shows the check lists which need to be used by the players of the game every month and every quarter;

FIG. 10 illustrates a typical delivery note as used by participants;

FIG. 11 illustrates a typical tender form;

FIG. 12 illustrates a market form for the fourth quarter of a trading year;

FIG. 13 illustrates a quarterly Income Statement;

FIG. 14 illustrates a monthly Balance Sheet;

FIG. 15 illustrates an exemplary look-up table for use in simulating a market with elastic demands;

FIG. 16 illustrates a container with a plurality of different tokens therein.

Figure 1:
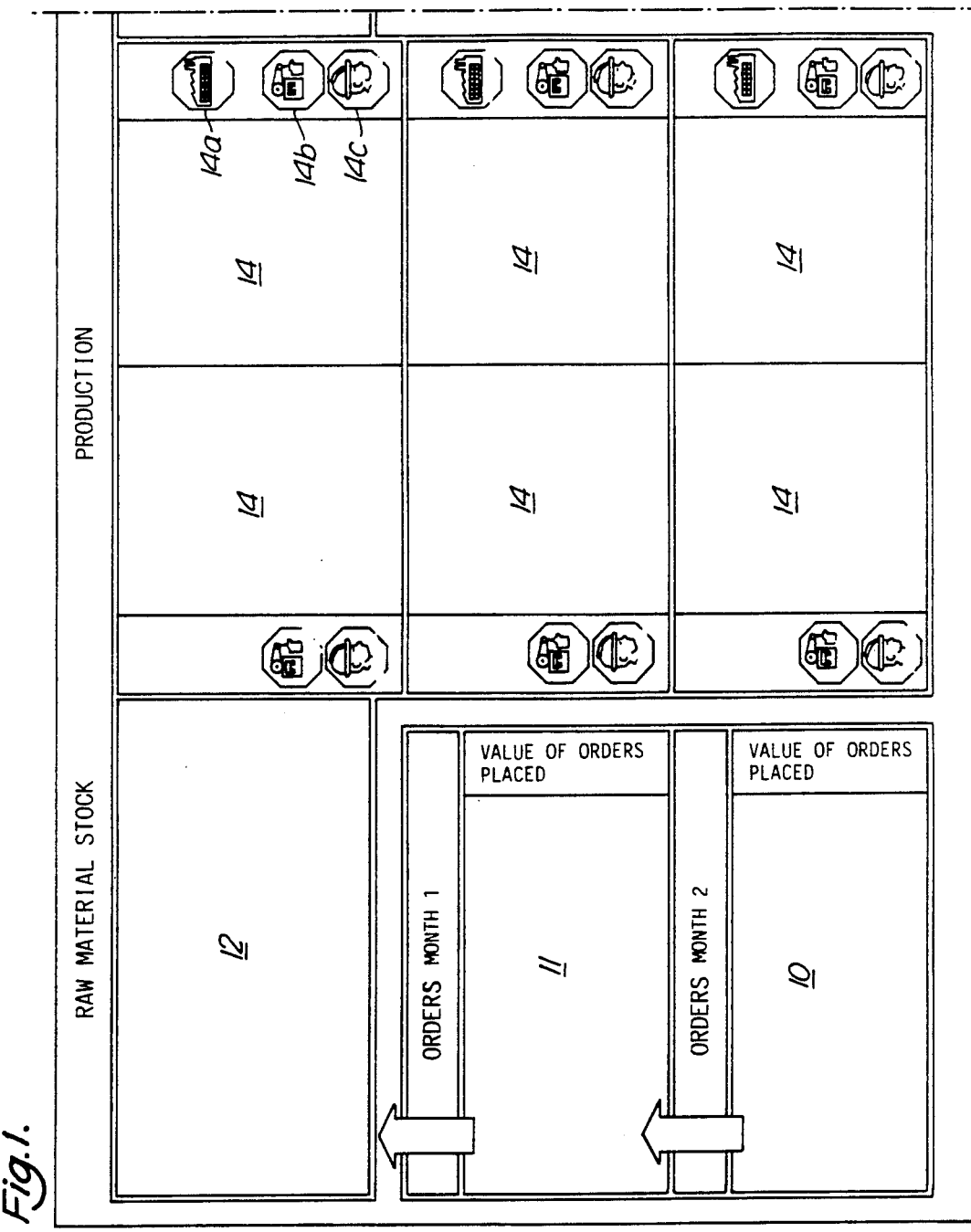
FIG. 1 is a view of the left-hand side of a playing board for the model.

In FIG. 1 there is shown the left-hand side of the board representing the production side of the business model. Each area 14 represents a location for a plant which may be used to process raw material stock to obtain finished goods with these being arranged in pairs, each pair being located in a single factory. An area 12 is shown for raw material in stock waiting to be processed in the plant with areas 10 and 11 being provided to receive and process orders for raw material until it is delivered into the stock 12.

Figure 2:
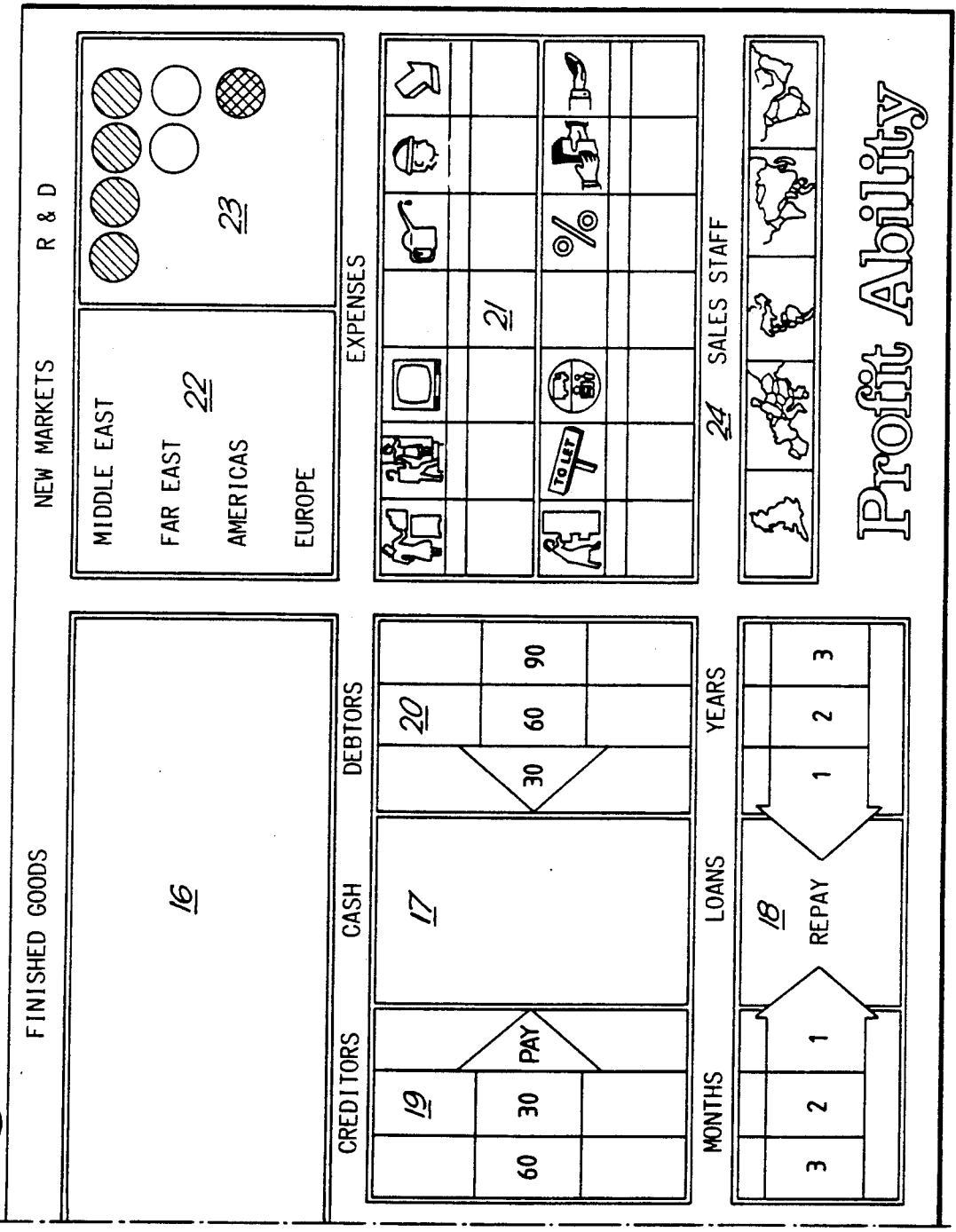
FIG. 2 is a view of the right-hard side of the playing board.

FIG. 2 shows the right-hand side of the board indicating a store 16 for finished goods, location 17 for containing cash in hand, with areas 19 and 20 on either side thereof for processing payments with creditors and debtors. The area 18 shows the process of tokens indicating loans with the area 21 representing varying amounts which may be paid by people playing the game for the various expenses indicated thereon and which would be incurred in normal business circumstances. In expenses area 21, the top row of pictorial boxes, left to right, represent "Sales Salaries", "Market Research", "Advertising", "Plant Overhead", "Unrecovered Labour" and "Depreciation". The bottom row, left to right, represent "Administration", "Rent", "Leases", "Cash Discounts", "Interest" and "Tax". Area 22 is an indicator of new markets and area 23 of the cost of research and development. Area 24 provides means for showing sales staff in different areas of the world. In sales staff area 24, the geographical territories represented in the boxes, left to right are "Home", "Europe", "Americas", "Far East", and "Middle East".

Figure 3A:
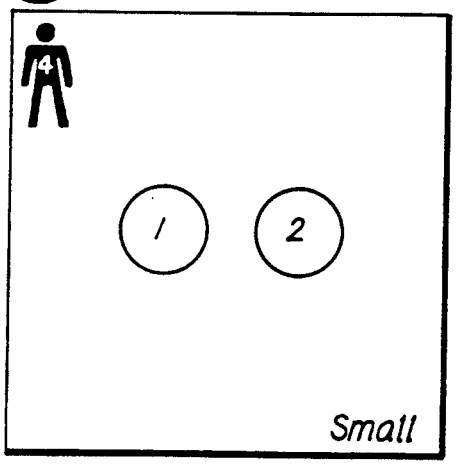
FIGS. 3a and 3b are views of the opposite sides of a card used to represent a plant or factory to be placed on the board.
Figure 3B:
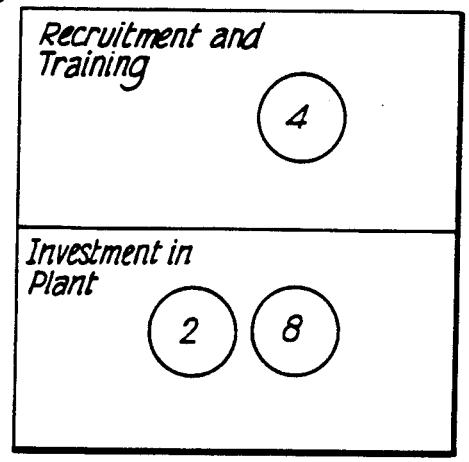
Figure 4A:
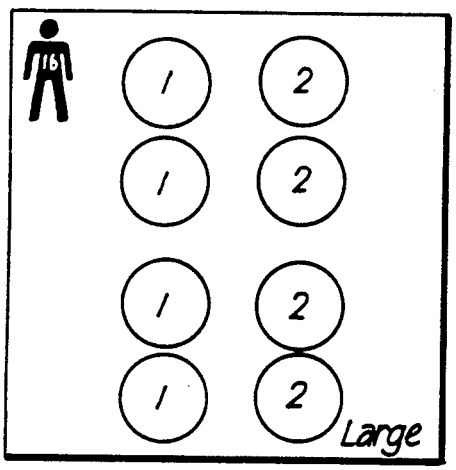
Figure 4B:
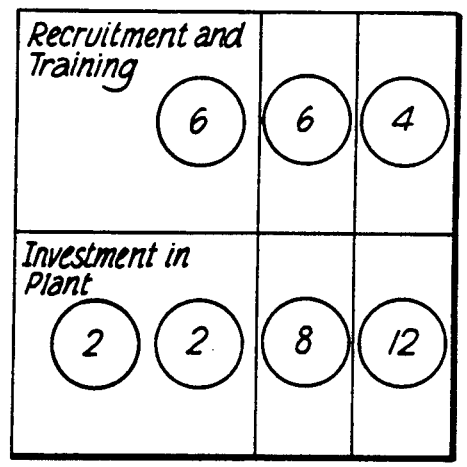
Figure 5A:
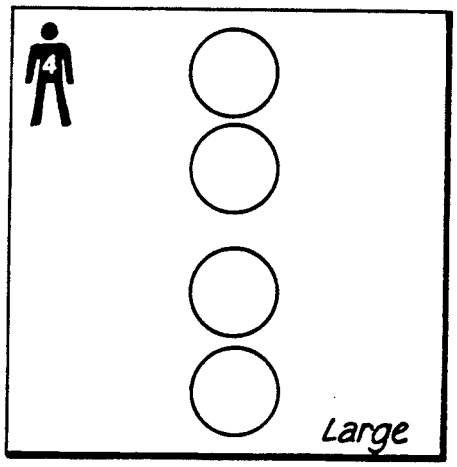
Figure 5B:
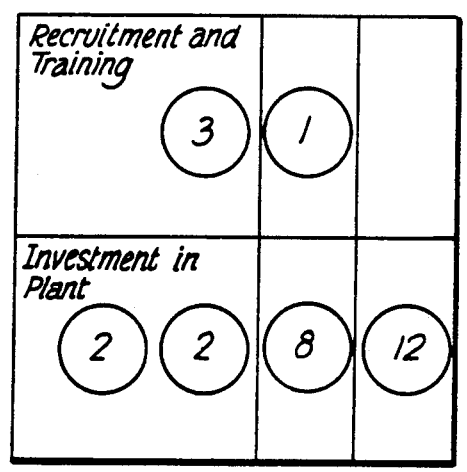
Figure 6A:
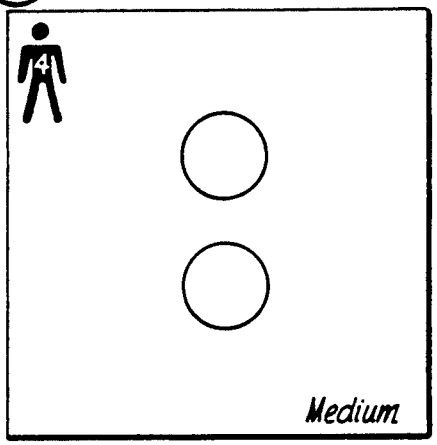
Figure 6B:
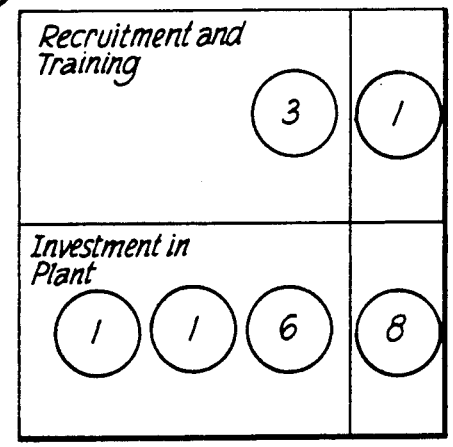
Figure 7A:
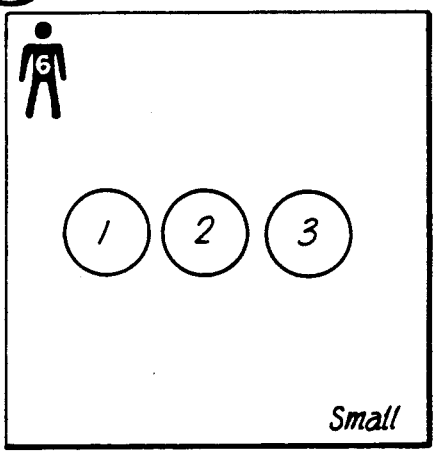
Figure 7B:
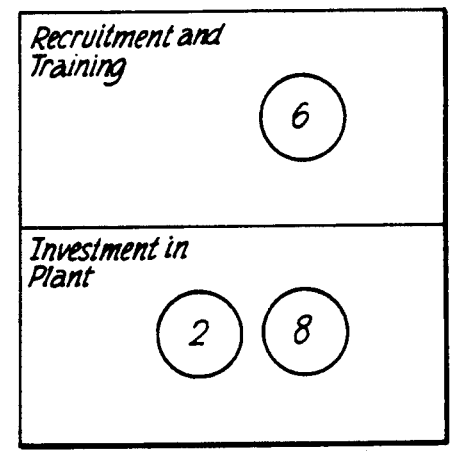
Figure 8A:
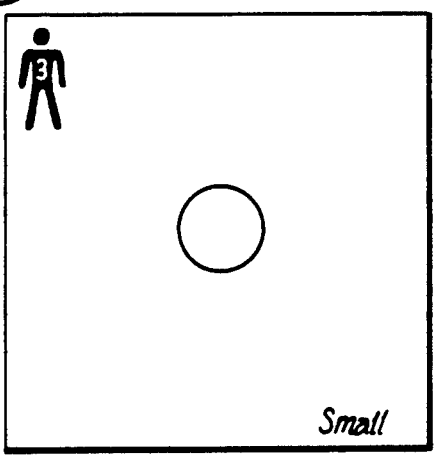
Figure 8B:
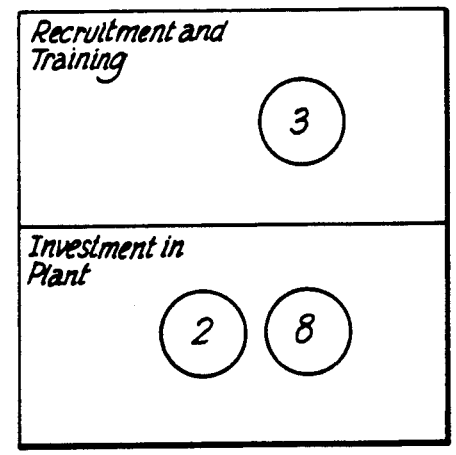

The plant cards are in different colours to show which product they produce and are designed to represent production processes of different durations, costs and volumes of production. Basically, they will control operations such that the large volume will be more expensive to set up but will operate more efficiently, once set up, than the small volume plant and will thus produce goods more cheaply. When a player has decided to erect a plant in a particular factory area, he will need to pay for the building of the factory by putting the appropriate amount of money in the factory area (14a) beside the space 14 and the plant card can then be installed in one of the areas 14 with its B side uppermost. The appropriate amounts of money will then be placed in the appropriate spaces in the recruitment and training areas and in the plant investment areas on side B of the card with the quantities being inserted month by month as delineated. Thus, in FIG. 3b, when first installing the plant, one would put two units of money on the space marked 2 and in the following month one would put four units on the space marked 4 in the recruitment and training area and eight in the space marked 8 in the area for investment in plant and then the following month those amounts can be removed from the card and equivalent value markers put on the marked spaces 14b and 14c beside the area 14 and the card inverted to show the A side which can then be used month by month to process raw material by moving it from the raw material space 16 to the space marked 1 on the card and the following month to the space marked 2 on the card and then to the finished goods space.

The control of cash, of loans and the marketing of finished goods is controlled by the right-hand side of the board and overall the operation of the model will be appreciated from the following explanation as would be provided to participants who are to use the model.

Investing in New Plant

To set up a new plant, place the card in your factory, and pay the amount shown onto the first ring marked "Investment in Plant".

Each month when you reach the "Invest in Plant" instruction on the checklist, pay the amount shown onto the next ring. When all the rings are full, the plant is fully paid for.

When you have made the final payment, take all the money from the "Investment" circles, and put it in a tube beside the plant card, on the octagon 14b marked "Plant". This shows you the total investment you have made in the plant. You can then turn the plant card over ready for production, and get your "people" chips from the game leader.

Recruitment and Training

When you set up a new plant, you need to recruit and train people to work on it. You do this by paying the amount shown onto the ring marked "Recruitment and Training" just above the current month's investment in plant.

Recruitment and training starts one or two months after the investment in plant, depending or the plant design.

When you have completed your investment in plant and want to turn the card over, call the game leader who will take your "Recruitment and Training" investment in exchange for green "people" chips, which you can put next to the plant card on the "people" octagon 14c.

Depreciation

Every year an appropriate allowance has to be made for depreciation and in order to do this you abstract a cash token from each of the factory and plant spaces containing cash adjacent the production plant areas 14 and put it in the depreciation area of the expenses area 21. For the purposes of convenience, each cash unit is considered as being £1000.

Upgrading so Plant to Increase Capacity

You can increase capacity by upgrading a small or medium plant into a larger one.

First you must run off the existing work in progress, so that the plant is empty.

Then cover the existing plant card with the type of plant you wish to have.

If you are upgrading a small plant to a medium, pay the £8000 shown on the right of the vertical line for investment, and the amount shown above it for recruitment.

If you are upgrading a small plant to a large one, pay the amounts shown to the right of the vertical lines, over two months.

If you are upgrading a medium plant to a large, pay only the amounts shown at the far right of the card for investment and (with white plants) recruitment. No further recruitment is needed for blue and yellow plants because both medium and large plants use the same number of workers.

Changing Products

You can produce a new product by opening a new plant to make it. If you wish to increase your total production, you do this by investing in new plant, and recruiting and training staff as described above.

If, however, you wish to keep the same output, but change product then you can sell off your existing plant at its book value. Call the game leader to arrange this.

The workers can be transferred freely to other plants of the same size or smaller, but training is needed to transfer them to a larger plant. If you fire excess workers, you have to give them redundancy payments equal to three months' wages.

Labour Costs

Your workers need to be paid wages every month, whether or not you have work for them to do. If they are idle, for instance due to a shortage of raw materials, or because their plant is being upgraded, their wages must be put to "Unrecovered Labour" among the Expenses.

Staff Transfers

Staff may be moved without cost or delay from any plant to an equal or smaller plant. To move staff from a smaller plant to a larger one, they must be trained on full salary for one month, without producing any product.

Sales Staff

Each Unit of sales staff allows you to tender for two orders in the region where they work. Sales staff may be employed at any time, and require a salary of £2000 per month.

Redundancies

If you wish to reduce the workforce, three months' wages must be paid as redundancy payment at the time of dismissal.

Short Term Loans

You can borrow units of £20,000 from the bank at 20% interest. £1000 interest is paid in advance, on receipt of the loan, and the capital must be repaid or the load renegotiated when three months have passed.

Medium Term Loans

You can borrow money from the bank in units of £30,000 at 13.3% interest. Interest of £1000 is paid in arrears, at the end of each quarter, and the capital must be repaid when two years have passed.

Developing New Products

The cost and time taken to develop new products are:

|        | Cost (£000) | Delay    |
|--------|-------------|----------|
| Blues  | 5           | 1 month  |
| Whites | 10          | 2 months |
| Browns | 20          | 4 months |

These costs are paid onto the blue, white or brown circles in the R & D area at the rate of £5000 per product per month. R & D can proceed on more than one product at once.

Total Quality Programmes

With the exception of Browns, all products can be produced at a higher quality, with no extra cost in materials and labour, if a Quality Initiative is undertaken.

Quality costs £10,000 per product, paid over two months on the yellow circles in the R & D area. After completion, a product will carry a 10% premium over the tender price, unless all competing products are top quality.

Browns can only be produced at standard quality.

Marketing

There are a number of wholesale customers in the market, and you compete for their orders through tenders. Each order goes to the tender with the lowest price. Some customers demand more credit than others.

Tenders

You may tender for as many orders as you wish in the market, providing that you have enough tenders available. Each unit of sales staff entitled you to two tenders, and for every £1000 you spend on advertising you get one extra tender per two sales staff in that region.

You must prepare all your tenders (using the tender forms as illustrated in FIG. 11) before coming to the market, and may not change them once the market has opened. You may withdraw tenders that have been prepared, for instance if you are out of stock through sales at the start of the market, but you do not get any refund on tendering costs.

It is important to check your tenders before submission, since they are binding on you; if you quote too low a price by mistake, and win the tender, you will have to deliver at that price.

Market with Elastic Demand

In order to simulate a market with elastic demand, the volume of orders awarded can be varied with the price of the winning tender. Prices above the market norm will win less units, or none at all, in accordance with a demand curve. Prices below the norm will attract greater volumes than those tendered for in accordance with the same demand curve. Different market behaviours can be shown through charges in the market norm price for a product and the shape of the demand curve. The game leader can use look-up tables to compute the volumes offered and the tenderer can accept or decline the extra volume.

FIG. 15 shows a look-up table to determine how many goods will have been sold. The illustrated look-up table has a ruling recommended retail price (RRP) for the product in that market, illustrated as RRP9 although other look-up tables will be provided for different RRP values. The table comprises nine boxes, each referring to the number of goods tendered and thus if, for example, five goods were tendered at a price of 65 the price range containing the price on the tender would be in the range of 73 to 71 and thus the number of goods which can be expected to have been sold is shown beside this range, e.g. 3.

Thus, when using this means as approximating market mechanism, the procedure would be that in order to compete in a particular market for a given product in a given region, a team must have completed market development investments, have a sales force in the region, and have a capacity to produce the product. Tenders would be submitted at market and the lowest price would win the bid. If there is a tie for the lowest price, the market leader will win the bid. If neither party is market leader, the higher quality wins the bid. If no other factor distinguishes competitors, they are asked to quote delivery times, and the earliest delivery will win the bid. It is only once the bid has been won that the look-up table exemplified in FIG. 15 will be used to determine how many of the goods have been sold.

The look-up tables can be constructed to represent various elasticities of demand, retail prices and quantities. They could be dispensed with where one is asked to consider the market behaviour as being inelastic. Markets can also be designated to show preferences other than those referred to above. For example, in one region delivery time or quality may have a higher priority than price in determining who wins an order.

Price

The maximum price which customers are prepared to pay may vary from market to market and from time to time according to the maturity of the markets and the state of the local economy. No tenders above the maximum price guideline will be accepted even if unopposed.

Delivery

Orders must normally be delivered within four months of acceptance, or a 10% price penalty will be applied. Orders which were won on the basis of quoted delivery times must be delivered as agreed, or they will incur penalties of 10% per month.

Credit

The "Call for Tenders" shows the amount of credit required by each customer. If you win an order marked 90, you will receive your cash three months after you deliver the goods to the customer. In the meantime, the money owed you will sit in the "Debtors" area of your board. You must place it in the third column to begin with, and update it each month by moving it one step towards cash.

New Markets

To enter a new market, you have to pay market development costs of £3000 per month for the period shown. These represent such expenses as travel and accommodation when researching the new market, setting up and equipping a sales outlet, recruiting and training staff, translating brochures into the local language, etc. Once the market development cost is completed, you can submit tenders in the new market in the normal way.

To keep an export market open, you must pay the salary of one sales person, even if you stop promotion and make no sales. If you do not employ sales staff in a market, you lost the right to sell in it. The market development money will be taken off your board, and you will have to start all over again if you wish to re-enter the market later.

Market Research

Information about the volume of demand for each product, the number of customers in each market, and trends in the RRP (recommended retail price) for each product are available from the game leader, the cost is £3000 for one quarter ahead, and £10,000 for a full year (four quarters).

Every month the player or players if a team is playing on the board will complete a monthly checklist (as shown in FIG. 9). This comprises carrying out the following actions:

1. New Markets

Pay £5000 onto the next empty circle for any new market you wish to enter.

2. Obtain Raw Materials

Spot purchases: buy for cash from the supplier.

Orders due: move the credit chips onto the Creditors area and accept deliveries.

3. Update Raw Material Orders

Move month 2 orders to month 1.

Place new orders with supplier, collect credit chips and place with order.

4. Production

Move all work in progress one step forward. Yellows will move from the plant to the Finished Goods area.

Blues and Whites will move one ring to the right, those on the last ring go to the Finished Goods area.

5. Invest in Plant

You can invest in new plants, or increase the production capacity of your existing ones.

6. Recruitment and Training

If you invest in new plant or upgrade your existing plant, you must pay to recruit and train additional production staff.

7. Bring Raw Materials to Plant

Move raw materials from stock onto the empty circles on the plants.

For Blue and White plants, put raw materials only on the rings marked "1".

8. Pay Labour

Take £1000 from cash for each worker in each plant, and pay it into the tubes in the plant. The number of workers is shown by the green chips beside the plant, and also by the number in the top left hand corner of the plant When some rings on the plant card are empty, pay only the standard amount into the tubes and put the rest on the "Unrecovered Labour" square among the expenses.

The standard amounts are:

|        | Small | Medium | Large |
|--------|-------|--------|-------|
| Yellow | 3     | 2      | 1     |
| Blue   | 2     | 2      | 1     |
| White  | 2     | 2      | 2     |
| Brown  | 3     | 2      | 1     |

9. Research & Development

You may develop new products, or develop an existing product to a higher quality, by paying money at the top right corner of the board.

10. Update Debtors

Move each tube one step to the left.

11. Update Creditors

Move each tube one step to the right, and put an equal amount of cash next to those which reach "Pay".

12. Update Loans

Move each short-term loan tube one step to the right. Repay any loans due with an equal amount of cash.

13. Pay Sales Salaries

Pay £1000 for each sales person onto the square among Expenses.

14. Pay Admin

Pay £1000 onto the "Admin" square among the Expenses.

15. Delivery Notes, Make Deliveries

For any orders which you can now fulfill, complete a delivery note (FIG. 10). If you have produced any product from more than one type of plant, count up the cost of sales carefully, as it will vary. Take the goods to the game leader with the accepted tender form, and bring the money back to cash or debtors as appropriate. Also, every month, the balance sheet as shown in FIG. 14 will need to be completed.

Every quarter, the quarterly checklist as shown in FIG. 9 will need to be completed with, as indicated previously, tenders being made at this time using the tender form. Also, every quarter, the income statement as shown in FIG. 13 will need to be completed as well as the market sheet shown in FIG. 12 in order to keep a record of what has been happening month-by-month and quarter-by-quarter.

As will be appreciated, the apparatus required for the education model will comprise a board as shown in FIGS. 1 and 2, a plurality of plant cards, a selection of which are shown in FIGS. 3 to 8, a plurality of discs coloured to simulate money, appropriately these may be a plurality of silver discs each representing £1000, a plurality of similar sized discs to represent creditors, these discs being of a different colour, conveniently red, and a plurality of differently coloured discs for representing stocks to be processed. Again these discs will be of a similar size and similar value to the cash discs but will be of a different colour. They may, for example, simply be all one colour to represent stocks generally or in a more complicated version for processing in the plant you may have the stock of different colours to represent different materials with different combinations of these materials being required in particular plant to produce the finished article. Instead of having the single silver discs to represent money, additional different coloured discs may be used to indicate different values, for example black to show £10,000 and/or different currencies.

Preferably, tubes of plastic material are provided for containing the different coloured counters. Thus, while the counters may simply be moved as heaps or piles about the board, it is more convenient to tip them in and out of the plastic tubes with the proportions of different coloured counters in a tube being very readily visible from the outside to show the proportions of cash value, raw material value etc which may be represented by the contents of that tube.

While such tubes could be of circular shape, it is preferred that they have flat side faces so as to reduce the chance of their rolling, should they get knocked over and conveniently an octagonal cross-section tube has been found to be suitable. Different shaped or coloured tubes may be used at different locations on the board to represent, for example, the fact that they, with contents, show the value of a finished product.

FIG. 16 illustrates a transparent, open-topped container of octagonal cross-section containing tokens with different coloured tokens being illustrated by the presence or absence of various cross-hatchways.

We claim:

1. A business education model comprising a plurality of sets of tokens, the tokens of one set being distinguishable from the tokens of another set, the tokens of different sets indicating respectively the values of raw material, cash and debts;

a board itself comprising separate areas representing factory plant, a place for stocking bought raw materials, a location for illustrating the expense of the equipment and manning of manufacturing plant, a location for processing cash and loans, a location for showing the costs of building up a marketing force and a location for containing tokens showing expenditure incurred in the running of the model business, the appropriate tokens being locatable on and movable between different ones of their areas during use of the model;

and a plurality sets of plant cards, each said plant card indicating a different plant which may be locatable on one of said factory plant areas to show the commitment required for plant and labour required in a particular manufacture, each card of a said set of plant cards being differently coloured from other cards in said set and each said card containing spaces for different instructions thereon, the cards representing plant or varying capacity, cost and productivity, said plant cards having spaces representing month-by-month expenses in setting up the plant on one side thereof and spaces representing month-by-month processing of raw material on the other side thereof, there being provided indicia on each space on said one side of each card indicating the value of tokens to be provided on that space, and indicia on each space on said reverse side of each card indicating the value of tokens to be provided on that space.

2. A model according to claim 1, wherein the tokens are of a similar size but are distinguishable by the different sets of tokens being of different colours.

3. A model according to claim 2, wherein the set of tokens indicating raw materials is itself made up of sub-sets of different coloured materials to indicate different raw materials to be processed.

4. A model according to claim 1, wherein tubes are provided for containing the tokens, these tubes being open-topped so that they can readily have the value tokens inserted thereinto or tipped out therefrom and having a cross-sectional shape corresponding with the shape of said plant card spaces and said board locations.

5. A model according to claim 4, wherein the tubes are non-circular in cross-section.

6. A model according to claim 4, wherein the tubes are transparent with certain of the tubes being distinguishable from others by being of varying shape or colour.

7. A model according to claim 1, including further distinguishable tokens which indicate trained employees capable of operating a plant to indicate the cost of training.

8. A model according to claim 1, including a plurality of machinery cards which are distinguishable to represent the nature of the machine, the type of production and processing it uses, its capacity, and the type of product it produces.

9. A model according to claim 1, which includes a further token distinguishable to show market leadership.

10. A model according to claim 1, including a plurality of tender forms which can be completed to indicate a tender where the model is being utilised with different people controlling a plurality of said boards, each board representing an individual company.

11. A model according to claim 1, including a plurality of lookup tables showing how the amount of business won by any tender depends on competitive factors which may include the unit price of goods or services sold, the amount supplied, market share, delivery time, and quality, such business amount varying according to theories relating to elasticity of demand.

12. A model according to claim 1, wherein the tokens are of a similar size but are distinguishable by the different sets of tokens being of different colours.

13. A model according to claim 12, wherein the set of tokens indicating raw materials is itself made up of subsets of different coloured materials to indicate different raw materials to be processed.

14. A model according to claim 1, wherein there are further provided a plurality of plant cards, each said card indicating a different plant which may be locatable on one of said factory plant areas to show the commitment required for plant and labour required in a particular manufacture, each said plant cards have spaces representing month-by-month expenses in setting up the plant on one side thereof and spaces representing month-by-month processing of raw material on the reverse side thereof, said spaces corresponding in shape with the cross-sectional shape of said tubes.

15. A model according to claim 1, including a plurality of market research reports for different products.

16. A model according to claim 1, including a plurality of check-lists, each check-list comprising a list of actions to be taken each business period.

17. A business education model comprising a plurality of sets of tokens, the tokens of one set being distinguishable from the tokens of another set, the tokens of different sets indicating respectively the values of raw material, cash and debts; a board itself comprising separate areas representing factory plant, a place for stocking bought raw materials, a location for illustrating the expense of the equipment and manning of manufacturing plant, a location for processing cash and loans, a location for showing the costs of building up a marketing force and a location for containing tokens showing expenditure incurred in the running of the model business, the appropriate tokens being locatable on and movable between different ones of their areas during use of the model; and a plurality of tubes for containing the tokens, these tubes being open-topped so that they can readily have the value tokens inserted thereinto or tipped out therefrom, said tubes having a cross-section related to the size and shape of said locations whereby said tubes are adapted, whilst containing tokens, to be placed at said locations.

18. A model according to claim 17, wherein the tubes are non-circular in cross-section.

19. A model according to claim 17, wherein the tubes are transparent with certain of the tubes being distinguishable from others by being of varying shape or colour.

20. A model according to claim 17, including further distinguishable tokens which indicate trained employees capable of operating a plant to indicate the cost of training.

21. A model according to claim 17, including a plurality of machinery cards which re distinguishable to represent the nature of the machine, the type of production and processing it uses, its capacity, and the type of product it produces.

22. A model according to claim 17, which includes a further token distinguishable to show market leadership.

23. A model according to claim 17, including a plurality of tender forms which can be completed to indicate a tender where the model is being utilised with different people controlling a plurality of said boards, each board representing an individual company.

24. A model according to claim 17, including a plurality of lookup tables showing how the amount of business won by any tender depends on competitive factors which may include the unit price of goods or services sold, the amount supplied, market share, delivery time, and quality, such business amount varying according to theories relating to elasticity of demand.

25. A model according to claim 17, including a plurality of market research reports for different products.

26. A model according to claim 17, including a plurality of check-lists, each check-list comprising a list of actions to be taken each business period.

27. A business education model, comprising a plurality of boards, each board being marked out to show separate labelled areas representing specific assets, liabilities and expenditures of a business, and each board representing a company competing with the other companies, represented by others of said boards, in the same industry;

a plurality of sets of tokens, the tokens of each set being distinguishable by colour from the tokens of the other sets; and a plurality of clear tubes in which the tokens are stackable, such that each board with pluralities of tokens stacked in different tubes and located on marked areas of the board represents a detailed balance sheet and expense account for a business, each stack of tokens, by nature of the colour of the tokens, the number in the stack and the position on the board, representing visually the precise nature and amount of each item comprising the balance sheet or expense account of the company represented by the board.

28. A business education model according to claim 27, wherein there are further provided a plurality of plant cards, each type of said plant card representing a different type of plant, and representing by its colour the type of product that it can produce; and through the number and position of a plurality of marked positions (indicia) on one side, on which stacks of tokens may be located, how many time periods the production process takes, the number of units of production that can be accommodated at any one time, and the labour costs incurred in the production of each unit; and through the number and position of indicia on the other side, the time and cost required to buy, lease, install or commission the plant, or to convert it to provide higher capacity or higher productivity.

* * * * *

UNITED STATES PATENT AND TRADEMARK OFFICE
CERTIFICATE OF CORRECTION

PATENT NO. : 5,056,792

DATED : October 15, 1991

INVENTOR(S) : Brian Helweg-Larsen et al

It is certified that error appears in the above-identified patent and that said Letters Patent is hereby corrected as shown below:

Column 2, line 61, "right-hard" should be -- right-hand --.

Column 4, line 39, "or" should be -- on --.

Column 4, line 58, delete "so".

Column 8, line 48, after "plant" insert -- card. --.

Column 8, lines 51-52, "expenses" should be -- Expenses --.

Column 9, line 12, "Notes" should be -- Note --.

Column 12, line 6, "re" should be -- are --.

Signed and Sealed this

Thirteenth Day of April, 1993

*Attest:*

STEPHEN G. KUNIN

*Attesting Officer*      *Acting Commissioner of Patents and Trademarks*

US005056792C1

(12) REEXAMINATION CERTIFICATE (4562nd)
United States Patent
Helweg-Larsen et al.

(10) Number: US 5,056,792 C1
(45) Certificate Issued: Apr. 30, 2002

(54) BUSINESS EDUCATION MODEL

(75) Inventors: Brian Helweg-Larsen, 16 Highmore Cottages, Little Missenden, Amersham (GB), HP7 0RB; Gordon F. Cousins, 4, Delamare Street, Farramere, Benoni, Transvaal (ZA)

(73) Assignees: Brian Helweg-Larsen, Amersham (GB); Gordon F. Cousins, Benoni (ZA)

Reexamination Request:
No. 90/005,093, Aug. 31, 1998

Reexamination Certificate for:
Patent No.: 5,056,792
Issued: Oct. 15, 1991
Appl. No.: 07/475,776
Filed: Feb. 6, 1990

Certificate of Correction issued Apr. 13, 1993.

(30) Foreign Application Priority Data

Feb. 7, 1989 (GB) .............................. 8902680

(51) Int. Cl.[7] ............................. A63F 3/00; G09B 19/18
(52) U.S. Cl. ........................ 273/278; 434/107; 434/109
(58) Field of Search ................................ 273/256, 278, 273/288, 290; 434/107, 109

(56) References Cited

U.S. PATENT DOCUMENTS 2,133,515 A * 10/1938 Horton, Jr. .................. 273/278

FOREIGN PATENT DOCUMENTS

| JP | 56-21178 | 2/1981 |
| JP | 61-240980 | 10/1986 |

OTHER PUBLICATIONS

Brochure for "Decision Base—How To Learn From Your Own Mistakes Without Ruining Your Company", prior to Feb. 7, 1989 (publication date unknown); Pages: all.
Decision Base Rules; prior to Feb. 7, 1989 (publication date unknown); Pages: all.
Decision Base Rules; prior to Feb. 7, 1989 (publication date unknown); Pages: all—including photographs of Decision Base Game pieces, prior to Feb. 7, 1989 (publication date unknown).
*Trade Off—A Sales Simulation*, Professional Skills Training, P.O. Box 259, Amersham HP7, ORR, UK (Copyright 1990 Brian Helweg–Larsen), Manual No. PST001433.
*Decision Base* board, Copyright 1981.

* cited by examiner

*Primary Examiner*—Benjamin H. Layno

(57) ABSTRACT

A business education model in which players may simulate the running of a company with the amounts and types of assets, liabilities and future commitments, contingent liabilities, of a company or other business enterprise being shown through the number, color and positions of symbols and markers on a board. The board is marked out with areas representing business premises or factory plant, areas for stocking bought raw material, tokens to represent values of raw material and goods for sale, cash and debts, these different tokens being preferably of a similar size but of different colors so that it can readily be appreciated what they represent, with their value being apparent by their total. The board also includes areas for illustrating the expense of the equipment and manning of plant, for processing cash and loans, for showing the costs of building up a marketing force and for containing tokens showing overhead expenditures incurred in the running of the model business.

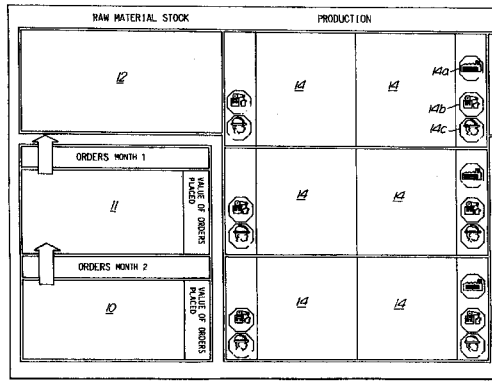
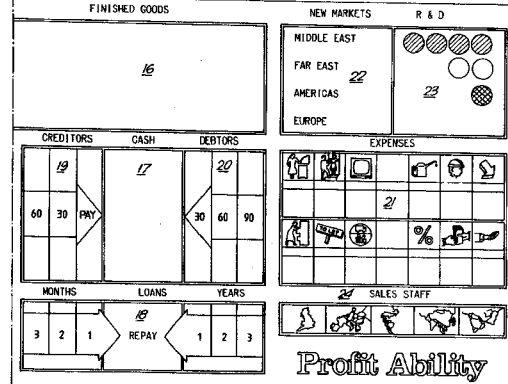

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–28 is confirmed.

New claims 29 and 30 are added and determined to be patentable.

*29. A model according to claim 1, wherein said board with said tokens stacked and located on marked areas of the board represents a detailed balance sheet and expense account for a business, each stack of tokens, by nature of the set of tokens which they are from, the number in the stack and the position on the board, representing visually the precise nature and amount of each item comprising the balance sheet or expense account of the company represented by the board.*

*30. A model according to claim 17, wherein said board with said tokens stacked and located on marked areas of the board represents a detailed balance sheet and expense account for a business, each stack of tokens, by nature of the set of tokens which they are from, the number in the stack and the position on the board, representing visually the precise nature and amount of each item comprising the balance sheet or expense account of the company represented by the board.*

* * * * *